(12) United States Patent
Araki et al.

(10) Patent No.: US 11,142,411 B2
(45) Date of Patent: Oct. 12, 2021

(54) CARGO HANDLING METHOD

(71) Applicant: SHIBAKAI CO., LTD., Tokyo (JP)

(72) Inventors: Manabu Araki, Tokyo (JP); Toru Araki, Tokyo (JP)

(73) Assignee: SHIBAKAI CO., LTD., Tokyo (JP)

( * ) Notice: Subject to any disclaimer, the term of this patent is extended or adjusted under 35 U.S.C. 154(b) by 0 days.

(21) Appl. No.: 15/555,014

(22) PCT Filed: Mar. 4, 2015

(86) PCT No.: PCT/JP2015/001137
§ 371 (c)(1),
(2) Date: Aug. 31, 2017

(87) PCT Pub. No.: WO2016/139701
PCT Pub. Date: Sep. 9, 2016

(65) Prior Publication Data
US 2018/0050875 A1    Feb. 22, 2018

(51) Int. Cl.
*B65G 63/00* (2006.01)
*B65G 53/24* (2006.01)
(Continued)

(52) U.S. Cl.
CPC ........... *B65G 63/004* (2013.01); *B62D 33/02* (2013.01); *B62D 63/06* (2013.01); *B63B 27/00* (2013.01);
(Continued)

(58) Field of Classification Search
CPC ....... B63B 35/28; B63B 25/004; B63B 25/28; B63B 19/14; B63B 27/02; B65G 63/004; B65G 67/603
(Continued)

(56) References Cited

U.S. PATENT DOCUMENTS 67,031 A * 7/1867 Des Corats ............. B63B 27/02
414/140.1
1,632,253 A * 6/1927 Triay, Jr. ............... B65G 63/002
187/403
(Continued)

FOREIGN PATENT DOCUMENTS

CN    1053198 A    7/1991
DE    1936310 A1   7/1971
(Continued)

OTHER PUBLICATIONS

U Malchow, "Port Feeder Barge: Advanced Waterborne Container Logistics for Ports", 2014, accessed on Dec. 10, 2019 @ http://yadda.icm.edu.pl/baztech/element/bwmeta1.element.baztech-5f3a5e7f-9134-41ee-8d4f-67379d2ea007. (Year: 2014).*
(Continued)

*Primary Examiner* — Gregory W Adams
(74) *Attorney, Agent, or Firm* — Renner, Otto, Boisselle & Sklar LLP

(57) ABSTRACT

The availability of a container crane or a dock is improved. A cargo handling method includes steps of: moving a lighter 601 to a different dock, the lighter 601 carrying a freight container wheeled platform 501 loaded on the lighter 601, the freight container wheeled platform 501 carrying a container 401 placed on the freight container wheeled platform 501 in a container yard; and unloading the freight container wheeled platform 501 from the lighter 601 to the different dock.

9 Claims, 7 Drawing Sheets

(51) Int. Cl.
  *B65D 88/12* (2006.01)
  *B62D 33/02* (2006.01)
  *B62D 63/06* (2006.01)
  *B63B 27/00* (2006.01)
  *B66C 19/00* (2006.01)

(52) U.S. Cl.
  CPC .......... *B65D 88/12* (2013.01); *B65D 88/121* (2013.01); *B65D 88/129* (2013.01); *B65G 53/24* (2013.01); *B65G 63/00* (2013.01); *B66C 19/002* (2013.01)

(58) Field of Classification Search
  USPC .......... 114/31, 72; 414/139.4, 139.6, 139.8, 414/139.9, 140.1, 140.3, 140.6, 142.2, 414/143.2, 803
  See application file for complete search history.

(56) References Cited

U.S. PATENT DOCUMENTS

| | | | | | |
|---|---|---|---|---|---|
| 2,669,210 | A | * | 2/1954 | Bernhard | B63B 27/00 114/31 |
| 3,519,147 | A | * | 7/1970 | Walda | B63B 25/004 414/143.2 |
| 3,790,009 | A | * | 2/1974 | Hauber | B63B 35/003 405/196 |
| 4,048,937 | A | * | 9/1977 | Heyman | B63B 43/04 114/72 |
| 4,826,355 | A | * | 5/1989 | Marion | B63B 35/003 405/195.1 |
| 4,898,112 | A | * | 2/1990 | McGlew | B63B 25/006 114/259 |
| 5,107,781 | A | * | 4/1992 | Ebeling | B63B 19/08 114/72 |
| 5,154,561 | A | * | 10/1992 | Lee | B63B 27/12 114/264 |
| 5,183,376 | A | * | 2/1993 | Aralt | B65G 7/02 405/209 |
| 5,511,922 | A | * | 4/1996 | Sekiguchi | B63B 25/008 14/71.3 |
| 5,599,153 | A | * | 2/1997 | Svensson | B60P 3/08 410/26 |
| 5,618,148 | A | | 4/1997 | Iversen et al. | |
| 6,845,873 | B1 | * | 1/2005 | Chattey | G01V 5/0075 212/270 |
| 7,845,898 | B2 | * | 12/2010 | Rawdon | B64D 9/00 244/118.1 |
| 2007/0187432 | A1 | * | 8/2007 | Snowdon | B65D 88/128 222/251 |
| 2008/0107505 | A1 | * | 5/2008 | McCown | B63B 25/004 414/140.1 |
| 2008/0226434 | A1 | * | 9/2008 | Smith | B65D 88/022 414/332 |
| 2011/0150606 | A1 | * | 6/2011 | Lee | B65G 63/006 414/140.1 |
| 2014/0079513 | A1 | * | 3/2014 | Kasai | B65G 63/004 414/139.4 |

FOREIGN PATENT DOCUMENTS

| | | | | |
|---|---|---|---|---|
| DE | 3217459 | A1 | | 11/1983 |
| DE | 19907915 | A1 | * | 9/2000 .......... B65G 67/603 |
| DE | 10234310 | A1 | * | 2/2004 .......... B65G 1/0492 |
| GB | 1 569 664 | | | 6/1980 |
| JP | S50-88773 | A | | 7/1975 |
| JP | 60015284 | | * | 1/1985 .......... B63B 25/004 |
| JP | S60-232330 | A | | 11/1985 |
| JP | S63-8094 | A | | 1/1988 |
| JP | H09-12156 | | | 1/1997 |
| JP | H09-76985 | A | | 3/1997 |
| JP | H10-250985 | | | 9/1998 |
| JP | H10-324389 | A | | 12/1998 |
| JP | 2001-146296 | A | | 5/2001 |
| JP | 2005-178619 | A | | 7/2005 |
| JP | 2008-150176 | A | | 7/2008 |
| JP | 2011-79611 | A | | 4/2011 |
| JP | 2012-86949 | | | 5/2012 |
| JP | 2014-156290 | | | 8/2014 |
| WO | WO-9518037 | A1 | * | 7/1995 .......... B63B 19/12 |
| WO | WO 02/36423 | A1 | | 5/2002 |
| WO | 2012022355 | A1 | | 2/2012 |

OTHER PUBLICATIONS

Jonghoe & Morrison, "Offshore port service concepts: classification and economic feasibility", 2011, accessed on Dec. 10, 2019 @ https://link.springer.com/content/pdf/10.1007%2Fs10696-011-9100-9.pdf (Year: 2011).*

Malchow, U, Innovative Waterborne Logistics for Container Ports, Jun. 22, 2010, pp. 1-47, available at https://repository.tudelft.nl/islandora/object/uuid:aa1a3976-44a7-440b-b639-11e4f1d0209f. (Year: 2010).*

International Search Report for corresponding International Application No. PCT/JP2015/001137, dated Jun. 9, 2015.

* cited by examiner

CARGO HANDLING METHOD

TECHNICAL FIELD

The present invention relates to a cargo handling method for landing a freight container or bulk cargo.

BACKGROUND ART

Bulk cargo, such as minerals (e.g., iron ores and coals) and grains (e.g., soybeans and wheat), transported by ship, may be intermittently landed by a grab bucket, or may be continuously landed by air transport. In the latter case, a cargo handling system referred to as a pneumatic unloader, for example, mounted on a dock is used (see, for example, Patent Documents 1 and 2).

Meanwhile, a freight container transported by a container ship is landed by a container crane mounted in a container yard (see, for example, Patent Documents 3 and 4). A freight transportation container landed is once placed in the container yard, for example, and is then transported by a trailer truck.

CITATION LIST

Patent Document

PATENT DOCUMENT 1: Japanese Unexamined Patent Publication No. H09-12156
PATENT DOCUMENT 2: Japanese Unexamined Patent Publication No. 2014-156290
PATENT DOCUMENT 3: Japanese Unexamined Patent Publication No. H10-250985
PATENT DOCUMENT 4: Japanese Unexamined Patent Publication No. 2012-86949

SUMMARY OF THE INVENTION

Technical Problem

Bulk cargo and freight containers are landed using respective dedicated apparatuses mounted on a dock as described above. This makes it relatively easy to improve the efficiency of each apparatus in operation, while making it difficult for one of the apparatuses to land freight to be handled by the other apparatus (i.e., to land bulk cargo at a wharf for container ships or land a freight container at a wharf for bulk cargo ships). Thus, the availability of some of the apparatuses tends to decrease, for example, if one type of freight is significantly different in amount from another type of freight. In addition, it takes a long time to successively transport, by trailer trucks, many freight containers landed. This may reduce the availability of a container crane or a dock where the container crane is mounted.

In view of the foregoing background, it is therefore an object of the present invention to facilitate improving the availability of a container crane or a dock.

Solution to the Problem

The present invention provides a cargo handling method. The method includes steps of: moving a lighter to a different dock, the lighter carrying a freight container wheeled platform loaded on the lighter, the freight container wheeled platform carrying a container placed on the freight container wheeled platform in a container yard; and unloading the freight container wheeled platform from the lighter to the different dock.

Advantages of the Invention

According to the present invention, improving the availability of a container crane or a dock may be facilitated

DESCRIPTION OF EMBODIMENTS

Figure 1:
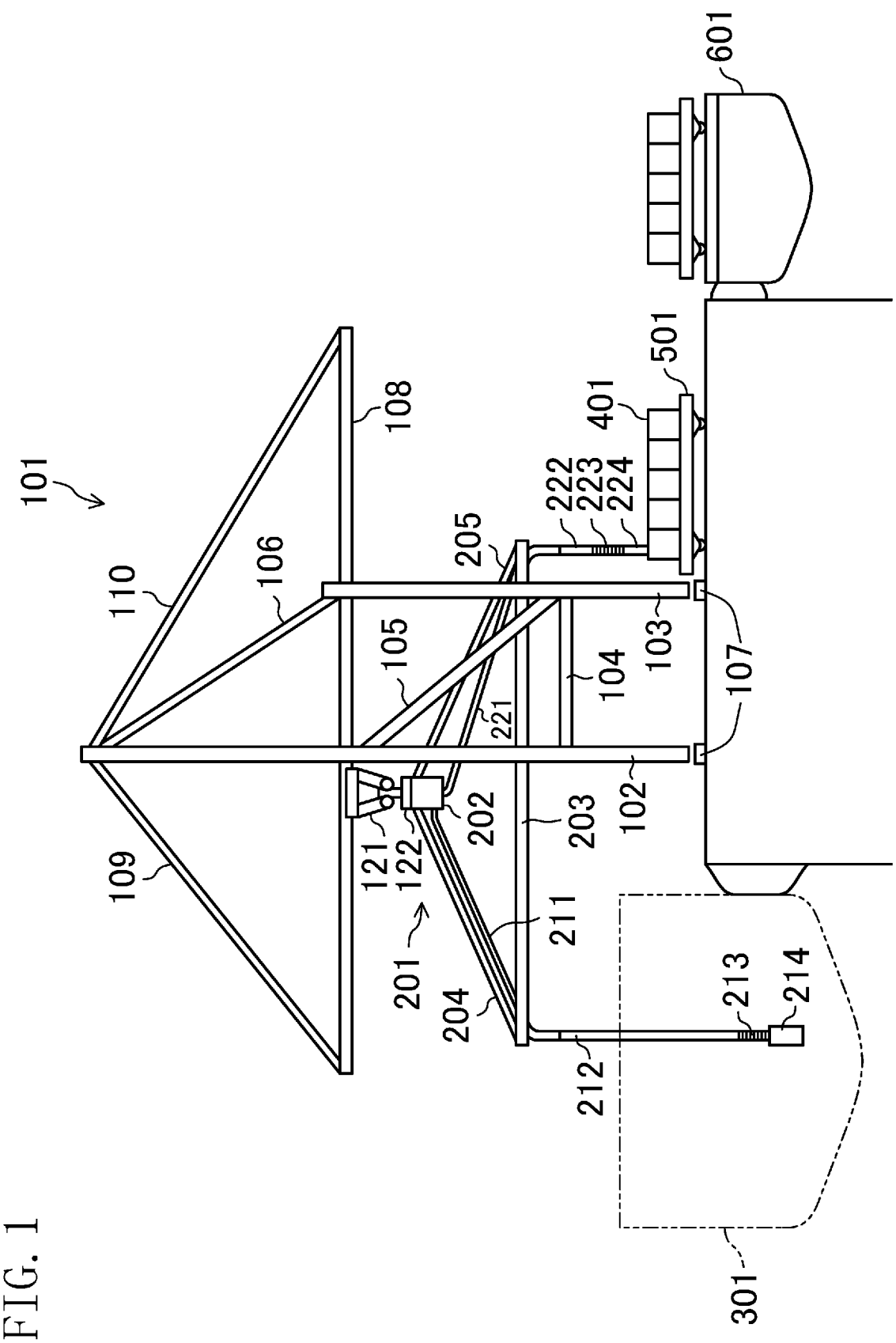
FIG. 1 A diagram showing an example in which bulk cargo is handled in a container yard where a gantry crane is mounted.

Embodiments of the present invention will now be described in detail with reference to the drawings.
(Summary of How Bulk Cargo is Landed)
First, a summary of how bulk cargo is landed will be described with reference to FIG. 1. A gantry crane 101 is mounted on a dock where a ship 301 loaded with bulk cargo lands. A unitized pneumatic unloader 201 is suspended from a trolley 121 of the gantry crane 101. The pneumatic unloader 201 is designed to suck up bulk cargo, such as grains, transported by the ship 301 through a suction pipe 211 and to discharge the bulk cargo from the pneumatic unloader 201 to a discharge pipe 221.

The discharged bulk cargo fills a container 401 having an outer shape similar to that of a typical freight container. The container 401 is placed on a wheeled platform 501, and is then loaded on a lighter 601. The loaded container may be transferred to, and unloaded on, another dock together with the wheeled platform 501.

The components described above will now be described.
(Gantry Crane 101)
The gantry crane 101 is mounted on a dock referred to as a container yard, and generally has the following structure, for example. Specifically, the gantry crane 101 includes legs 102 and 103 extending vertically. The legs 102 and 103 are connected together through a connector 104, and are reinforced by reinforcers 105 and 106. Wheels 107 are respectively attached to the bottoms of the legs 102 and 103 so that the gantry crane 101 may be moved along the dock. The legs 102 and 103 have an upper portion to which a boom 108 is attached. The boom 108 extends horizontally. Tension bars 109 and 110 are attached to the upper portion of the leg 102. The tension bars 109 and 110 each obliquely connect an associated one of tip ends of the boom 108 and the top of the leg 102 together. The boom 108 is provided with the trolley 121 movable along the boom 108. The trolley 121 is provided with a spreader 122, which suspends the pneumatic unloader 201 described in detail below or a freight container transported by a container ship.

(Pneumatic Unloader 201)

The pneumatic unloader 201 includes a frame 202, a boom 203 extending horizontally, and tension bars 204 and 205 connecting the frame 202 and the boom 203 together. The frame 202 is joined to the suction pipe 211 and the discharge pipe 221, which are supported on the boom 203 and other members. The suction pipe 211 is joined to a suction nozzle 214 through an expansion pipe 212 and a flexible pipe 213 to suck up bulk cargo in the hold of the ship 301. The discharge pipe 221 is joined to a discharge nozzle 224 through an expansion pipe 222 and a flexible pipe 223 to discharge the bulk cargo sucked up from the ship 301.

Figure 2:
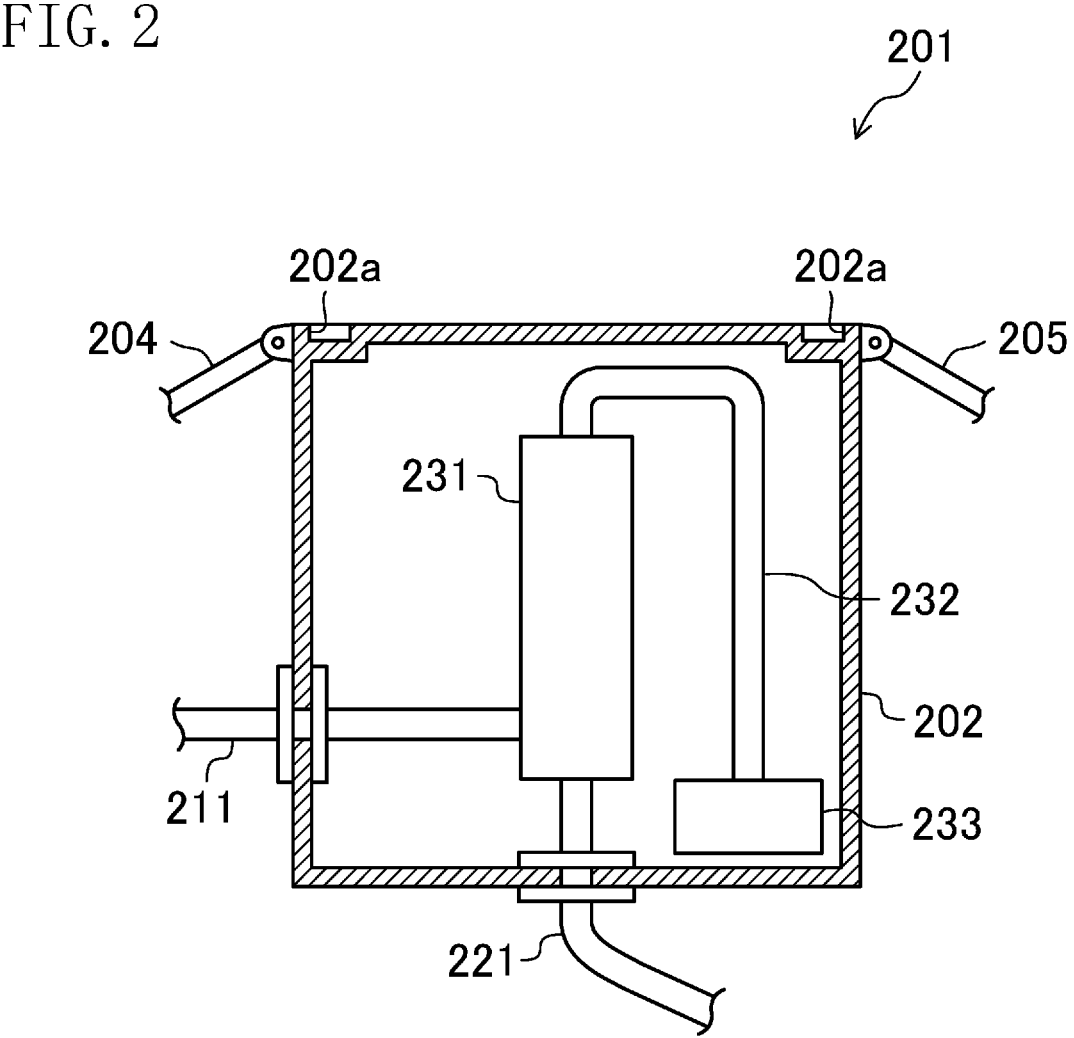
FIG. 2 A cross-sectional view showing a configuration for a pneumatic unloader.

As shown in FIG. 2, the pneumatic unloader 201 is connectable to the spreader 122 of the gantry crane 101 through engaging portions 202a which are provided on an upper portion of the frame 202 and which have a structure and layout similar to those of a typical freight container in conformity with ISO standards, for example. In other words, the mounting of a typical gantry crane 101 allows the pneumatic unloader 201 to be used while being connected to the gantry crane 101.

The frame 202 includes therein a separator 231 joined to the suction pipe 211 and the discharge pipe 221. The separator 231 is joined to a blower 233 that sucks air through an air pipe 232. The bulk cargo loaded on the ship 301 is sucked up together with the air, is separated from the air by the separator 231, and is discharged from the discharge pipe 221.

Using the pneumatic unloader 201 described above may make it easy to land bulk cargo and perform any other operations even on a container ship dock where the typical gantry crane 101 is mounted and where freight containers are handled. This may improve the flexibility in landing bulk cargo and facilitate effective use of the dock.

If the frame 202 of the pneumatic unloader 201 hermetically contains the separator 231 and other components, dust and other substances may be easily prevented from being produced in general. However, this is merely an example of the present invention. A structure that is not especially sealed, such as a framed structure, may be used as well.

The suction pipe 211 and the discharge pipe 221 do not always need to be supported on the boom 203 and other members, and may be supported by, for example, one or more trolleys 121 separately provided on the boom 108 of the gantry crane 101.

For example, at least one of the suction pipe 211 or the discharge pipe 221 may include a plurality of pipes so as to obtain higher transport capacity.

The suction pipe 211 and the discharge pipe 221 (and the boom 203 and other members) may be designed to be extendable and retractable also in a horizontal direction and to be pivotable in a vertical direction. As a result, the position at which the bulk cargo is sucked through the suction nozzle 214 and the position at which the bulk cargo is discharged through the discharge nozzle 224 may be shifted without moving the trolley 121 and the pneumatic unloader 201.

(Container 401)

Figure 3:
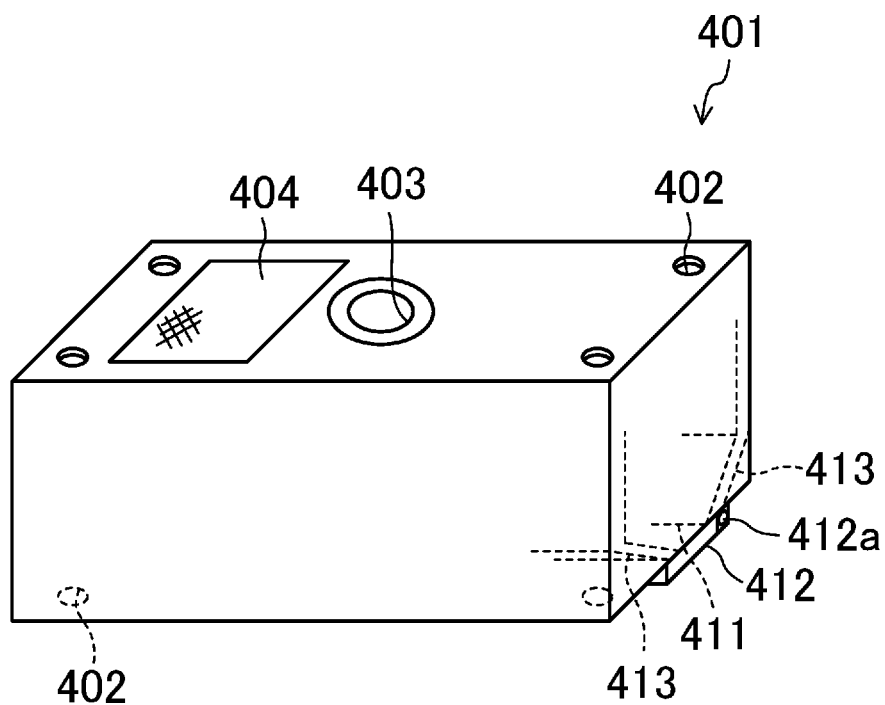
FIG. 3 A perspective view showing a configuration for a freight container.

The bulk cargo sucked up from the ship 301 by the pneumatic unloader 201 described above may be stored in a silo or any other space, or may be loaded on a truck. However, the bulk cargo may be handled just like a typical freight container by being charged into such a container 401 as shown in FIG. 3.

The outer shell of the container 401 has upper and lower surfaces each provided with engageable portions 402 respectively engaged with connectors, referred to as, for example, twist locks, at four corners of the surface. The engageable portions 402 each have a size and a shape in conformity with ISO standards or other standards, for example. The top of the container 401 has an opening 403 through which bulk cargo flows into the container 401. The opening 403 is beneficially connectable to the discharge nozzle 224 of the pneumatic unloader 201 by flange coupling or any other coupling process with the container 401 kept hermetic. However, a simple opening merely needs to be formed, depending on types and other characteristics of the bulk cargo.

The top of the container 401 is further provided with a filter 404, through which air in the container 401 is exhausted when bulk cargo is charged into the container 401, and which may reduce the amount of dust and other substances flowing out.

The bottom of the container 401 has an outlet 411 through which bulk cargo is discharged. The outlet 411 may be opened and closed by an outlet lid 412 that is turnable on a rotary shaft 412a. The container 401 includes therein an inclined plate 413 extending from the periphery of the outlet 411 to a side wall of the container 401. This allows bulk cargo in the container to be easily discharged with reliability.

Using the container 401 described above may make it easy to handle such bulk cargo just like a typical freight container even in a container yard where a grab bucket for handling bulk cargo, a cargo handling system such as a pneumatic unloader, a storage facility such as a silo, and any other suitable device are not provided. This may improve the flexibility in landing bulk cargo and facilitate effective use of the dock.

A baffle board may be provided near the inner surface of the filter 404 in the container 401 to make it less likely for bulk cargo to come into direct contact with the filter 404. This may more easily reduce the amount of dust and other substances flowing out.

The filter 404 does not always need to be provided at one location, but may include a plurality of filters dispersed at multiple locations. One or more filters may be provided for the side wall, for example. In this case, a baffle board or a partition wall may be used as necessary. Further, a plurality of filters may be provided for each of side walls of the container 401 at both longitudinal ends or other portions thereof. Alternatively, one or more filters may be provided for each of an upper wall and the side walls of the container.

The outlet lid 412 does not always need to be configured as the single lid as described above, but may be divided into two or more pieces to form a set of double doors. Alternatively, the container 401 may have an outlet lid which entirely or mostly covers the bottom of the container 401 and fully or substantially fully opens the bottom, for example. A door may be provided in the entirety or a portion of a side wall located at one of the longitudinal ends or a side wall extending longitudinally, such that the side wall may open and close.

An integral or separate lid or hatch may be provided to close the opening 403.

The container 401 described above may include therein an air conditioning unit that can control at least one of temperature or humidity. If the container is filled with grains or any other objects, for example, the provision of such a unit makes it easy to store the grains as they are. The grains may be landed at a wharf where no silo is provided, and may be stored on the spot, or may be stored at a destination. This may, for example, significantly enhance the flexibility in using the wharf, or may reduce the burden of providing a silo or any other facility (eliminate the need to provide a silo). Furthermore, in disaster situations or other situations, the container 401 may be used not only as a transport means for bulk cargo but also as a storage means at a destination.

(Wheeled Platform 501)

Figure 4:
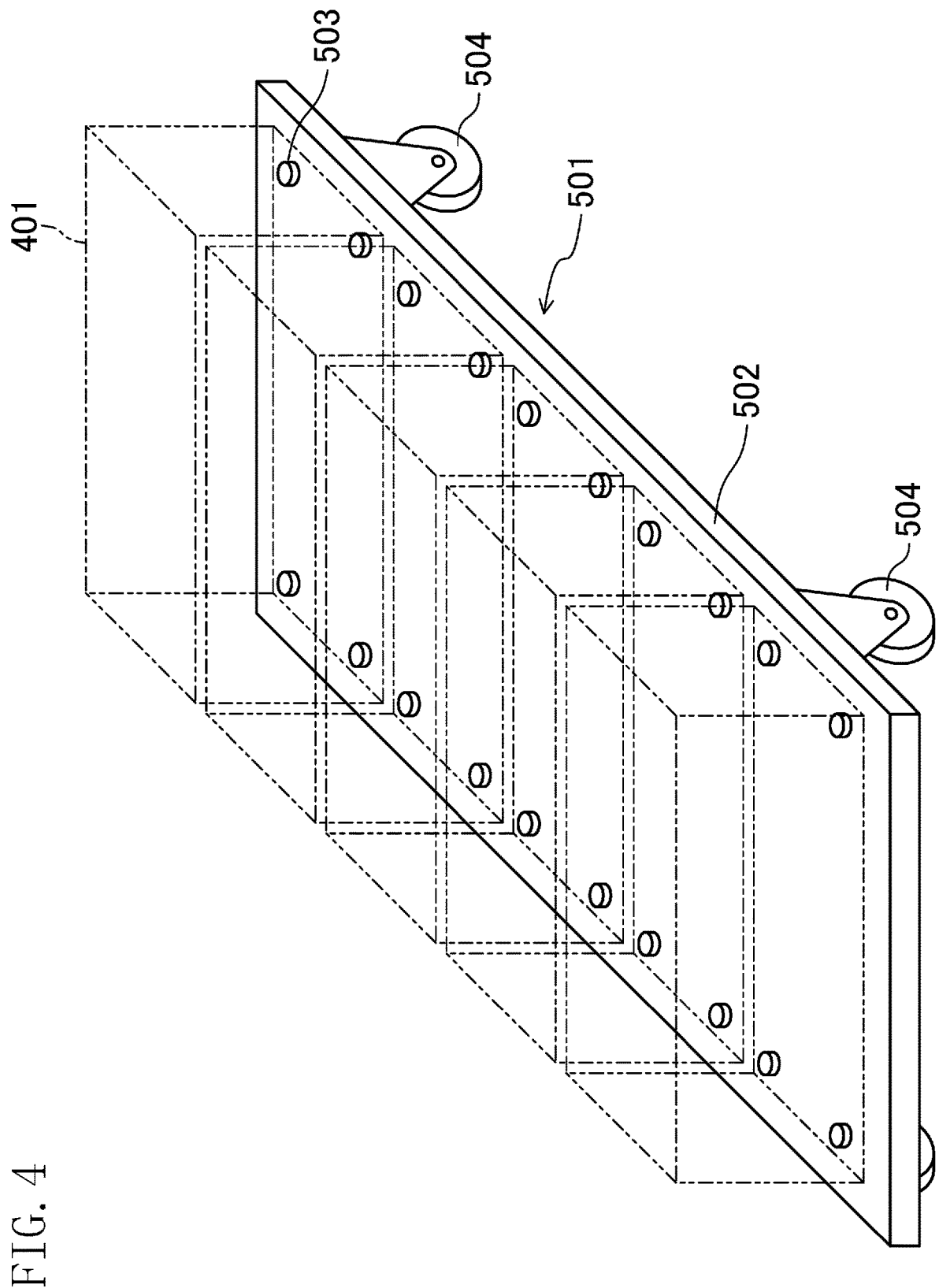
FIG. 4 A perspective view showing a configuration for a wheeled platform for freight containers.

The wheeled platform 501 includes a pedestal 502 on which the multiple containers 401 described above may be placed, as shown in FIG. 4. The pedestal 502 has an upper surface having engaging portions 503 similar to those used to fix a container in a ship or a trailer and in conformity with ISO standards, for example. A further member for lashing down a container, for example, may be provided.

An appropriate number of wheels 504 are attached to a lower portion of the pedestal 502. The wheels 504 may have a fixed orientation, or may be partially or totally steerable (turnable on a vertical axis by 90° or more, 180° or more, or 360°, for example). In particular, if all of the wheels 504 are designed to be turnable on a vertical axis, the direction of movement of the wheeled platform 501 may be changed without changing the orientation of the wheeled platform 501. This allows the direction of movement to vary, for example, between when cargo is loaded on the lighter 601 and when cargo is unloaded, and allows cargo to be easily loaded from a broadside of the lighter and to be easily unloaded through the bow or stern thereof, and vice versa. A drive motor may be provided to drive some or all of the wheels such as the steerable wheels so that the wheeled platform 501 is self-propellable.

Using the wheeled platform 501 described above allows the multiple containers 401 to be handled together. This may easily increase the availability of a container crane or a dock. In particular, transporting a combination of such a wheeled platform 501 and such a lighter 601 as indicated below to another dock allows the wheeled platform 501 to be easily landed from the lighter, and allows the containers 401 placed on the wheeled platform 501 to be easily loaded on a trailer without using a container crane mounted in a container yard. This may facilitate further increasing the availability of the container crane or the dock.

The containers 401 may be placed one over another in multiple layers on the wheeled platform 501 described above.

The wheeled platform 501 described above does not always need to be used for the placement of the containers 401 filled with bulk cargo, but may be used for placement and transport of typical freight containers.

To increase the stability with which the wheeled platform 501 travels, the wheeled platform 501 may be provided with safety wheel equipment (trigger equipment), which includes a laterally slidable and extendable arm or arms, or a laterally extendable arm or arms turning on a vertical axis, and a wheel provided for the arm or each of the arms. A maximum distance between the right and left wheels (tread) may be increased as necessary.

(Lighter 601)

Figure 5:
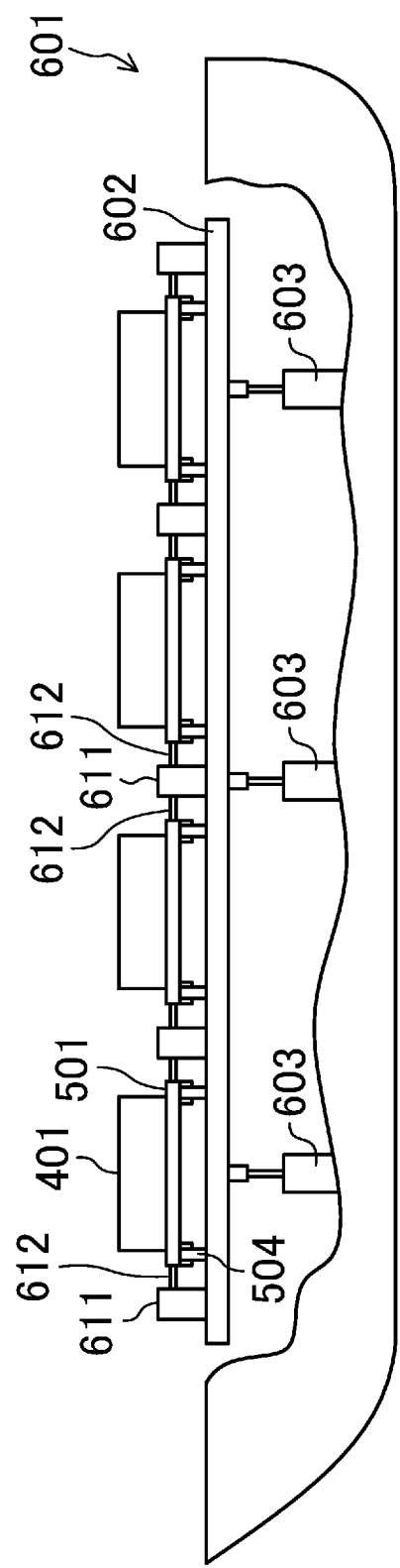
FIG. 5 A partial cross-sectional side view showing a configuration for a lighter.
Figure 6:
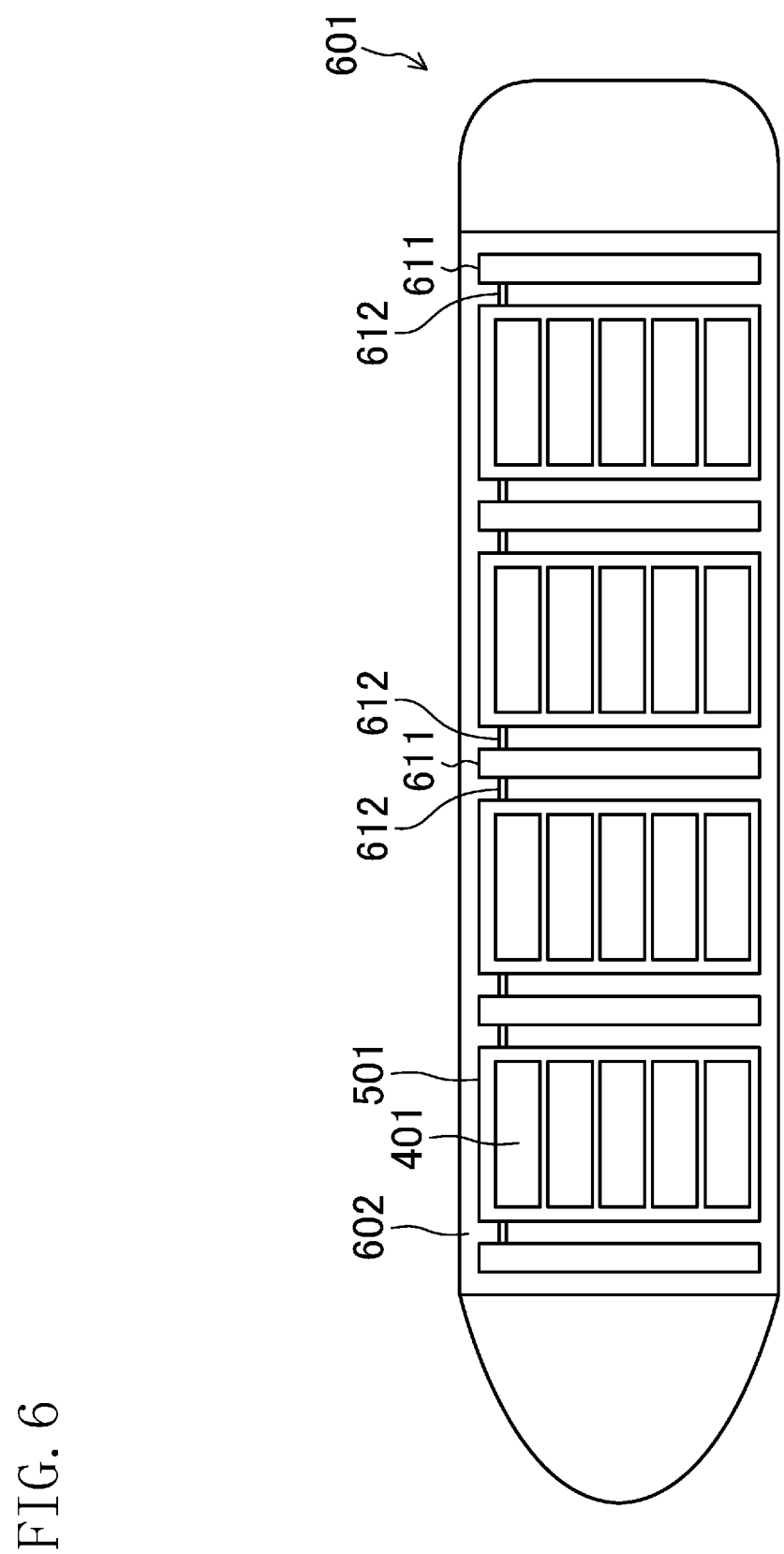
FIG. 6 A plan view showing a configuration for a lighter.
Figure 7:
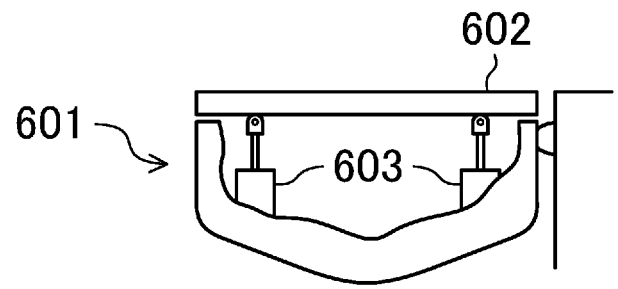
FIG. 7 A partial cross-sectional front view showing a configuration for a lighter.

The lighter 601 suitable for loading and transporting the wheeled platform 501 described above thereon includes a deck 602 provided on the hull as shown in FIGS. 5-7. The deck 602 is supported by a plurality of hydraulic cylinders 603, and is controllable such that its height may be adjusted to the height of the dock. This allows the wheeled platform 501 to be easily moved between the deck and the dock.

Wheeled platform drivers 611 are provided on the deck 602 to drive the movement (loading and/or landing) of the wheeled platform 501 between the deck and the dock. How to drive the movement should not be specifically limited. However, a connection arm 612 attached to a chain driven by a motor, for example, may be connected to the wheeled platform 501 to drive the movement.

In this embodiment, the lighter described above may include an engine, and may thus be self-propellable, or may be towed by a tugboat, for example.

Using the lighter 601 described above allows the wheeled platform 501 on which a plurality of containers are placed to be easily loaded and unloaded without using a container crane. This may make it easy for the containers to be transported by trailer trucks in a dispersed manner using a dock where no container crane is mounted, for example. This may easily reduce traffic of trailer trucks in a container yard, and may easily increase the availability of a container crane or a dock.

The deck 602 may be further provided with a rail or a guide to guide the wheels 504 of the wheeled platform 501. A manual or automatic fixing mechanism or stopper, for example, may be provided to fix the loaded wheeled platform 501.

A foldable crossing plank extending across a gap between the deck 602 and the dock, for example, may be provided alongside the deck 602.

Figure 8:
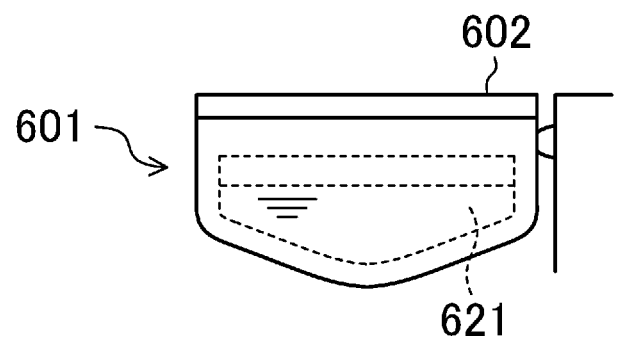
FIG. 8 A partial cross-sectional front view showing another configuration for a lighter.

To control the height of the deck 602, the hydraulic cylinders 603 do not always need to be used as described above. A ballast tank 621 may be provided in the hull as shown in FIG. 8, for example, and water may be injected and discharged into and from the ballast tank. The ballast tank 621 may be divided into port- and starboard-side pieces, and different amounts of water may be injected into, and discharged from, these pieces. This may allow the deck 602 to be inclined together with the hull. This inclination may allow the wheeled platform 501 to move between the deck and the dock, may facilitate moving the wheeled platform therebetween, or may reduce the driving load in a situation where the self-propellable wheeled platform 401 described above is used and other situations.

Figure 9:
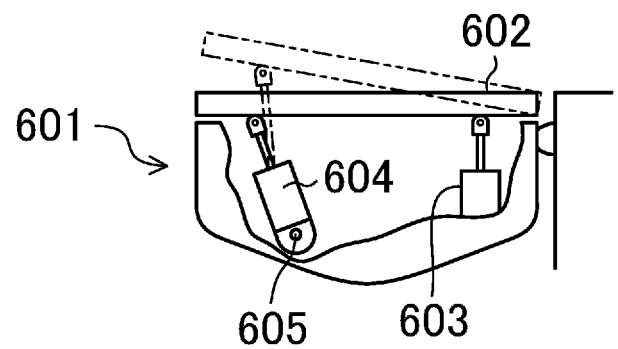
FIG. 9 A partial cross-sectional front view showing still another configuration for a lighter.

As shown in FIG. 9, for example, hydraulic cylinders 604 may be provided instead of at least either the port- or starboard-side hydraulic cylinders 603. The hydraulic cylinders 604 each have a cylinder body having an end portion axially supported by a turning pin 605 so as to be able to turn. The deck 602 may be able to be inclined by operating the hydraulic cylinders 603 and 604 separately.

Combining the hydraulic cylinder and ballast tank described above together may increase the range within which the height or inclination is adjustable, or may allow either the hydraulic cylinders or the ballast tank to (mainly or exclusively) adjust the height, and allow the other one to adjust the inclination. The ballast tank and the hydraulic cylinders may be used at a deepwater site and in shallow water, respectively, to adjust the height.

In this case, if the deck 602 is inclined as described above to move the wheeled platform 501, the lighter 601 or the wheeled platform 501 may be provided with a braking mechanism such that the speed of the wheeled platform 501 and the location to which the wheeled platform 501 moves are manually or automatically controllable. More specifically, the wheeled platform 501 may be braked to prevent its speed from exceeding a predetermined speed, for example. Such braking may be electronically performed, or may be mechanically performed using centrifugal force.

The difference in height between the deck 602 and the dock may be detected, and the hydraulic cylinders 603 and other components may be automatically controlled to adjust the height of the deck 602 to the height of the dock. Such control easily allows the height and inclination of the deck 602 to be adjusted in accordance with, in particular, a shift in the center of gravity of the wheeled platform 501. More specifically, for example, the deck 602 may be maintained in a horizontal position or adjusted to a predetermined inclination in accordance with the movement of the wheeled platform 501 over the deck 602. If the wheels of the wheeled platform 501 extend over the deck 602 and the dock, the height and inclination of the deck 602 may be adjusted in accordance with the magnitude and location of a load applied to the deck 602.

Not only in a situation where the wheeled platform 501 is transported, but also in a situation where any other wheeled platform or a load is transported, making the height of the deck 602 adjustable as described above may facilitate moving a load between the deck 602 and the dock.

If bulk cargo is landed using a combination of the containers 401, wheeled platform 501, and lighter 601 described above, any of various procedures indicated below may be used.

(a) After the containers 401 have been each filled with bulk cargo, the containers 401 are placed on the wheeled platform 501, and the wheeled platform 501 is loaded on the lighter 601.

(b) After the containers 401 placed on the wheeled platform 501 in advance have been each filled with bulk cargo, the wheeled platform 501 is loaded on the lighter 601.

(c) After having been each filled with bulk cargo, the containers 401 are placed on the wheeled platform 501 that has been loaded on the lighter 601 in advance.

(d) The containers 401 placed on the wheeled platform 501 that has been loaded on the lighter 601 in advance are successively filled with bulk cargo.

If a combination of the wheeled platform 501 and lighter 601 described above are used, for example, to transport freight containers, which are landed from the ship 301 by the gantry crane 101, by trailer trucks in a dispersed manner, any of procedures indicated below may be used.

(a) Freight containers loaded on the ship 301 are placed on the wheeled platform 501 by the gantry crane 101, and the wheeled platform 501 is loaded on the lighter 601.

(b) Freight containers loaded on the ship 301 are placed, by the gantry crane 101, on the wheeled platform 501 that has been loaded on the lighter 601 in advance.

In the foregoing description, an example in which bulk cargo or freight containers transported by the ship 301 are landed has been described. However, bulk cargo or freight containers may be easily loaded on the ship 301 in a similar manner.

DESCRIPTION OF REFERENCE CHARACTERS

101 Gantry Crane
102 and 103 Leg
104 Connector
105 and 106 Reinforcer
107 Wheel
108 Boom
109 and 110 Tension Bar
121 Trolley
122 Spreader
201 Pneumatic Unloader
202 Frame
202a Engaging Portion
203 Boom
204 and 205 Tension Bar
211 Suction Pipe
212 Expansion Pipe
213 Flexible Pipe
214 Suction Nozzle
221 Discharge Pipe
222 Expansion Pipe
223 Flexible Pipe
224 Discharge Nozzle
231 Separator
232 Air Pipe
233 Blower
301 Ship
401 Container
402 Engageable Portion
403 Opening
404 Filter
411 Outlet
412 Outlet Lid
412a Rotary Shaft
413 Inclined Plate
501 Wheeled Platform
502 Pedestal
503 Engaging Portion
504 Wheel
601 Lighter
602 Deck
603 and 604 Hydraulic Cylinder
605 Turning Pin
611 Wheeled Platform Driver
612 Connection Arm
621 Ballast Tank

The invention claimed is:

1. A cargo handling method comprising steps of:

moving a lighter from an onshore container yard where a container ship can land and on which a gantry crane which loads and unloads a container to/from the container ship is mounted to a different onshore dock on which the gantry crane is not mounted, the lighter carrying a freight container wheeled platform loaded on the lighter, the freight container wheeled platform carrying the container placed on the freight container wheeled platform by the gantry crane in the onshore container yard;

unloading the freight container wheeled platform from the lighter to the different onshore dock; and transporting the container by trailer trucks in a dispersed manner using the different onshore dock on which the gantry crane is not mounted, and housing, by a bulk cargo handling system, bulk cargo in the container and thereafter placing the container on the freight container wheeled platform, wherein the bulk cargo handling system is configured to suck, transport, and handle bulk cargo, and wherein the bulk cargo handling system includes:
a frame having an engaging portion engageable with a spreader of a container crane;
a blower attached to the frame and configured to suck air; and
a separator attached to the frame and configured to separate bulk cargo sucked along with the air from the air sucked by the blower.

2. The cargo handling method of claim 1, wherein the lighter carrying a freight container wheeled platform loaded on the lighter comprises placing the container on the freight container wheeled platform, and then loading the freight container wheeled platform on the lighter.

3. The cargo handling method of claim 1, wherein the container includes
an outer shell configured to contain bulk cargo, and the outer shell includes:
an engageable portion engageable with a spreader of a container crane;
an opening through which bulk cargo flows into the outer shell; and
a filter configured to exhaust air in the outer shell.

4. The cargo handling method of claim 1, wherein the freight container wheeled platform includes:
a pedestal on which a plurality of freight containers are placed;
an engaging portion provided on an upper surface of the pedestal, the engaging portion being engageable with one of the freight containers; and
wheels provided on a lower surface of the pedestal.

5. The cargo handling method of claim 1, wherein the lighter includes:
a deck on which a load is loaded;
a control mechanism configured to control a height of the deck relative to a waterline.

6. The cargo handling method of claim 1, wherein the lighter carrying a freight container wheeled platform loaded on the lighter comprises placing the container on the freight container wheeled platform loaded on the lighter.

7. A cargo handling method comprising the steps of:
moving a lighter from an onshore container yard where a container ship can land and on which a gantry crane which loads and unloads a container to/from the container ship is mounted to a different onshore dock on which the gantry crane is not mounted, the lighter carrying a freight container wheeled platform loaded on the lighter, the freight container wheeled platform carrying the container placed on the freight container wheeled platform by the gantry crane in the onshore container yard;
unloading the freight container wheeled platform from the lighter to the different onshore dock; and
transporting the container by trailer trucks in a dispersed manner using the different onshore dock on which the gantry crane is not mounted, and
housing, by a bulk cargo handling system, bulk cargo in the container placed on the freight container wheeled platform,
wherein the bulk cargo handling system is configured to suck, transport, and handle bulk cargo, and
wherein the bulk cargo handling system includes:
a frame having an engaging portion engageable with a spreader of a container crane;
a blower attached to the frame and configured to suck air; and
a separator attached to the frame and configured to separate bulk cargo sucked along with the air from the air sucked by the blower.

8. The cargo handling method of claim 7, wherein the lighter carrying a freight container wheeled platform loaded on the lighter comprises placing the container on the freight container wheeled platform, and then loading the freight container wheeled platform on the lighter.

9. The cargo handling method of claim 7, wherein the lighter carrying a freight container wheeled platform loaded on the lighter comprises placing the container on the freight container wheeled platform loaded on the lighter.

* * * * *